United States Patent Office 3,687,646
Patented Aug. 29, 1972

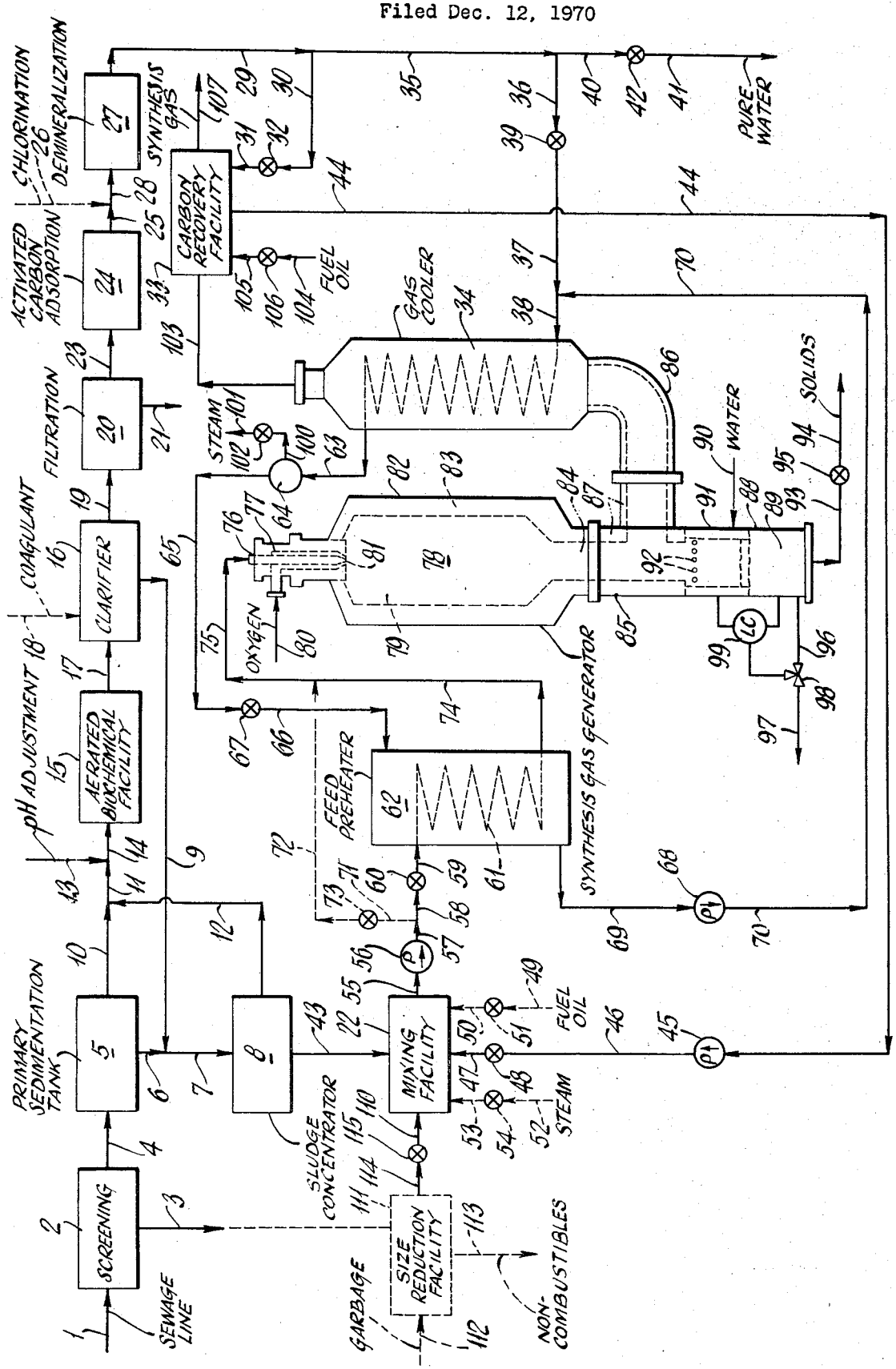

3,687,646
SEWAGE DISPOSAL PROCESS
Albert Brent, Dix Hills, New York, N.Y., and Charles F. Teichmann, Houston, Tex., assignors to Texaco Development Corporation, New York, N.Y.
Filed Dec. 21, 1970, Ser. No. 100,107
Int. Cl. C01j *3/00, 3/16*
U.S. Cl. 48—209
12 Claims

ABSTRACT OF THE DISCLOSURE

Sewage is converted into a suseful non-polluting product gas, e.g. synthesis gas or fuel gas by dewatering municipal sanitary sewage, producing a thickened sludge. The thickened sludge is mixed with a fluid selected from the group consisting of $H_2O$, liquid hydrocarbon fuel, particulate carbon slurries in water or in a liquid hydrocarbon fuel is produced subsequently in the process, and mixtures thereof to produce a feed mixture stream. Preferably the feed mixture is heated to a temperature in the range of about 212 to 600° F. to vaporize volatile constituents in the feed mixture and to produce a feed dispersion stream. The feed dispersion is then reacted by partial oxidation with an oxygen-rich gas in an unpacked free-flow non-catalytic synthesis gas generator, at a temperature in the range of about 1500 to 3000° F. and at a pressure in the range of about 1 to 250 atmospheres to produce synthesis gas. Water separated from the sewage is purified and used for industrial applications or converted into by-product steam by indirect heat exchange with the product gas. In a second embodiment of the invention, garbage is disposed of by mixing bits of garbage with thickened sewage sludge and the aforesaid fluid thereby forming a feed mixture which is converted into synthesis gas by the partial oxidation reaction with an oxygen-rich gas in said flow type gas generator.

BACKGROUND OF THE INVENTION

Field of the invention

This invention relates to a novel high temperature partial oxidation process for disposing of solid waste matter such as sewage, garbage, or a mixture of both without polluting the nation's environment. More particularly, it relates to the partial oxidation of sewage sludge or mixtures of sewage sludge and garbage for generating hydrogen and carbon monoxide.

Description of the prior art

The increasing deterioration in the quality of today's urban environment is alarming to many ecologists.

Solid organic matter which is deposited from domestic sanitary sewage by sedimentation, also referred to as raw sewage sludge, is readily putrescible and would produce a serious local nuisance if exposed to open air or if discharged into a stream. Pathogenic organisms may be found in domestic wastes and frequently may be the source of infection. Lengthy, biochemical processes, often referred to as anaerobic digestion, are now commonly employed to produce a relatively insoluble inert, and stable organic residue which may be separated from the associated liquid by draining. These processes may take about five months to a year or more to effect complete organic decomposition, requiring extensive facilities to accommodate the sanitary needs of a large metropolitan area.

Garbage and other similar solid waste materials are new being generated in urban areas at the annual rate of nearly one ton per capita, and this rate may double by the year 2000. Solid waste disposal currently costs U.S. municipalities about $4.5 billion per year and commonly ranks as the third highest expense incurred by local governments (behind education and roads).

The predominant disposal method for garbage and other solid wastes is land fill, i.e. dumping, with or without open-pit burning. However, available land fill sites close to metropolitan areas are rapidly being exhausted, and costs of land, covering the garbage with dirt, and hauling are significant expense factors. Also, toxic wastes from buried trash may seep into and pollute underground streams which are commonly the source of our fresh water. Further, on-site burning as well as incineration, an alternative disposal method, contribute heavily to air pollution from noxious gases and soot.

It is obvious from the aforesaid that the disposal of sewage and garbage is one of the nation's most pressing environmental problems.

SUMMARY

Sewage from municipal service pipes is screened and separated into liquids and a thickened sludge having a combustible solids content in the range of about 25 to 50 weight percent. Purified water is obtained from the liquid portion as a by-product and used internally in the process for cooling and producing steam. Excess pure water may be discharged from the system and used externally for industrial applications.

A stream of thickened sludge is mixed with a fluid selected from the group consisting of $H_2O$, liquid hydrocarbon fuel, particulate carbon dispersions in water or liquid hydrocarbon fuel as produced subsequently in the process, and mixtures thereof to produce a feed mixture stream. Preferably the feed mixture stream is heated to a temperature in the range of about 212 to 600° F. to vaporize volatile constituents in the feed mixture stream and to produce a feed dispersion stream comprising particles of sewage, particulate carbon, liquid and vaporized hydrocarbon fuel, and steam. The feed dispersion stream is then reacted by partial oxidation with a stream of oxygen-rich gas in an unpacked free-flow noncatalytic synthesis gas generator at an autogenous temperature in the range of about 1500 to 3000° F. and at a pressure in the range of about 1 to 250 atmospheres to produce nonpoluting synthesis gas, fuel gas and other valuable by-products.

In a second embodiment of the invention, ground beneficiated garbage is processed by mixing it with thickened sewage sludge. This mixture is then mixed with a fluid such as described in the first embodiment to produce a feed mixture stream having a combustible solids content in the range of about 25 to 60 weight percent. The feed mixture is preferably preheated to volatilize the volatile constituents therein and to form a feed dispersion stream. The feed mixture or dispersion stream is then reacted with a stream of oxygen-rich gas in said synthesis gas generator in the same way as previously described in the first embodiment.

It is therefore a principal object of the invention to alleviate the mounting problem of sewage and garbage disposal without polluting the nation's environment.

Another object of the invention is to dispose of sewage and garbage by means of a low-cost continuous process which simultaneously produces valuable by-products.

Still another object of the invention is to provide an economical and efficient process for disposing of sewage and garbage without polluting the environment while producing pure water, steam, and synthesis gas as by-products.

DESCRIPTION OF THE INVENTION

The present invention involves an improved continuous process for disposing of sewage sludge in a flow type suspension gasification reaction system without polluting the nation's environment. Simultaneously, profitable by-products are produced in the form of synthesis gas, fuel gas, and soil improvers. In a second embodiment thickened sewage sludge mixed with garbage in fine particle form is similarly disposed of by means of a flow type gasifier.

The term "sewage" as used herein may be broadly defined as "water-carried wastes," particularly from municipal sanitary sewage lines containing body wastes (excreta), household wastes, community wastes such as street washings, etc., and some industrial wastes. The total solids content of the sewage in municipal lines is usually about 500 parts per million (p.p.m.) or more. The solids in sewage are mostly animal or vegetable substances, "organic matter," i.e. fats, carbohydrates, and proteins. Some mineral or inorganic constituents present include sand and clay, as well as the common mineral salts found in the water supply. Almost any type of organism may be found in sewage including bacteria, protozoa, spores and cysts.

When sewage is introduced directly into streams, nuisance results from the putrefactive decomposition of the aforesaid organic matter. This biochemical decomposition produces substances which quickly consume the dissolved oxygen in the water, causing the death by suffocation of practically all of the higher animals such as fish. Objectionable gases may also be produced, and there is the possibility of disease if pathogenic bacteria is present. The consumption of oxygen by sewage is called the "biochemical oxygen demand" or "BOD." BOD tests denote the amount of oxygen consumed by bacterial activity under standard sampling and test conditions, i.e. Standard Methods American Public Health Association. On the other hand, the term "chemical oxygen demand" or "COD" denotes the total oxidizable material present in the waste liquid regardless of whether or not it is biodegradable. COD may be determined by ASTM test method, D 1252–67. Although the BOD and COD of a sample of waste material are not comparable in all respects, generally a reduction in COD would indicate a reduction in BOD.

Typical properties of undigested raw sewage sludge from a sedimentation tank are shown in Table I.

TABLE I*

| | |
|---|---|
| Total solids, weight percent | 0.5 |
| COD, $mgO_2/l.$ (milligram $O_2$ per liter) | 60,000 |
| Residue on evaporation, mg./l. | 50,000 |
| Total volatile, mg./l. | 33,300 |
| Fixed residue, mg./l. | 16,700 |

*Standard Methods American Public Health Association (1955), residue measured at 103° C. and 600° C.

In the process, large objects and non-combustibles such as grit and gravel are first separated from the sewage. This is done by passing the raw sewage from the municipal service pipes through bar screens, i.e. screens made of bars spaced about three-fourths of an inch or more apart, which catch any large objects which would clog the channels or damage the pumps. Coarse heavy inorganic non-combustibles, i.e. gravel, cinders, sand, are next settled out in a grit chamber. The over-flow from the grit chamber may be passed through screens having openings about one-quarter inch or less. Such screens may be mechanically operated so that the screenings are continuously removed and the openings kept clean.

The sewage is then separated into sludge and liquids. This may be accomplished by any suitable way for separating solids and liquids, e.g. gravity settling, filtration, centrifugation or a combination thereof. A preferable procedure is to introduce the screened over-flow from the grit chamber into a primary sedimentation tank such as a continuous clarifier as shown in Perry's Chemical Engineers' Handbook, McGraw-Hill, Fourth Edition, 1963, page 19–50. Detention time in the sedimentation tank is sufficient for producing a sludge having a solids content of about .5 to 10 wt. percent, e.g. about 1 to 24 hours. The sedimentation tank may also serve as a hold-up tank to even out discontinuities in the sewage composition.

Liquid overflow from the primary sedimentation tank is processed in a suitable manner, and preferably for example as described below in order to reduce the BOD and organic solids content, and to purify and demineralize the water. The pure water may be then used subsequently in the process. The sludge is removed from the primary sedimentation tank and thickened to a solids content in the range of about 25 to 50 weight percent and preferably to about 32 weight percent by conventional means, e.g. centrifugation, vacuum filtration. Preferably, a sludge concentrator comprising a combination of a continuous gravity thickener and an expression press as shown in Perry's Chemical Engineers' Handbook, McGraw-Hill, fourth edition, 1963, page 19–74, may be used.

The liquid overflow stream from the primary sedimentation tank is mixed with the dilute effluent from the sludge concentrator to prouce a large volume of waste water containing about 20 to 70 weight percent of the putrescible solids originally present in the sewage. This stream of waste water is then processed to remove substantially all of the organic matter which is largely in the colloidal state of dispersion although some is in true solution and some in dispersion, and to produce pure water. The organic matter separated is combined with the sludge from the primary sedimentation tank and introduced into the sludge concentrator. The purity of the water produced should be such as to permit its use for industrial purposes. For example, within the process it may be used as a coolant of the product gas by indirect heat exchange in a waste heat boiler, and for the production of high pressure steam. Excess pure water may be discharged from the system and used externally for industrial applications.

Purification of the waste water overflow stream from the primary sedimentation tank may include a combination of any or preferably all of the following steps, depending upon its end use: pH adjustment; reduction of organic solids and BOD to about 20 parts per million or below, preferably by biochemical treatment; clarification, optionally with coagulation; filtration or centrifugation; demineralizing; activated carbon treatment, and disinfections.

Excessive acidic or basic waste waters are neutralized and the pH is adjusted to a level in the range of about 6 to 9. Bacteria and aquatic life are sensitive to pH levels outside this range. Accordingly, pH adjustment in this range is desirable to protect equipment, break emulsions, insolubilize certain organic materials, and to control reaction rate. Acidic reagents for pH adjustment include sulfuric acid and hydrochloric acid. Caustic reagents include sodium or ammonium hydroxide, and lime, e.g. $Ca(OH)_2$, CaO, $Ca(OH)_2 \cdot MgO$.

Anaerobic and aerobic biological treatment processes are preferably used to economically abate the bacterial oxygen-consuming pollution caused by the discharge of waste water contaminated with low concentrations of organic matter. Suitable conventional biological processes include activated sludge units, aerated stabilization basins, and trickling filters.

In a preferred embodiment in which the activated sludge process is integrated into the process the aforesaid waste water is passed into an aeration chamber where it meets a predetermined amount of activated sludge from the sedimentation of previously treated sewage containing flocs of microbial growth. The mixture is then stirred with compressed air for about 2 to 6 hours. By this process the colloidal organic matter is oxidized to carbon dioxide and nitrate. The effluent from the activated sludge plant may have its BOD decreased to $\frac{1}{10}$ of the influent waste water while coliform bacteria (M.P.N./100 ml.) may be decreased to $\frac{1}{1,000}$ of that in the influent waste water.

The liquor from the activated sludge process is then passed into sedimentation tanks or clarifiers, for example as previously described, where sludge settles and substantially clear water is discharged. Optionally, coagulants, e.g. hydrated oxides, aluminum hydroxide, iron hydroxide, alum, lime, or adsorbents e.g. clay, diatomite, activated carbon, petroleum coke, and particulate carbon recovered from synthesis gas porduced subsequently in this process may be added to the sedimentation vessel to facilitate the separation of the solids and to remove BOD. Optionally, when required the water may be softened at this point; and, also any phosphates may be converted to tricalcium phosphate sludge by well known procedures.

During the formation and settling of the flocs and precipitates, many of the finely divided suspended particles including microorganisms are collected and some of the dissolved substances are absorbed. The proper amount of coagulant and other chemicals is based on an analysis of the liquor or may be determined by experimentation. For example, about 2 to 10 pounds of aluminum sulfate may be added per 1000 gallons of liquor. A suitable reactor-clarifier comprising a cylindrical tank in which mixing, flocculation, and sedimentation may all be done is shown in Perrys Chemical Engineers' Handbook, fourth edition (1963), page 19–51, fig. 18–81. Detention times in the clarifier may range from about 1 to 5 hours.

The sludge stream from the reactor-clarifier or other suitable sedimentation vessel comprising about 96 to 99.5 weight percent of water is introduced into the aforesaid sludge concentrator along with the slurge stream from the primary sedimentation tank. If desired, the clear water overflow from the reactor-clarifier having a BOD of about 10–20 mg./l. may be chlorinated and discharged into a river. However in a preferred embodiment, the clear overflow from the reactor-clarifier is further processed by steps of filtration or centrifugation, activated carbon treatment, chlorination, pressure filtration, dimineralization, deaeration, and treatment with a foam suppressant to produce purified water for use as a coolant and for making steam.

The liquid effluent from the clarifier is passed through a suitable pressure filter or centrifuge. Typical filtration or centrifugation equipment are shown in Perry's Chemical Engineers' Handbook, fourth edition, 1963, pages 19–74 to 19–100.

After filtration the water may be passed through a bed of granular activated carbon e.g. 16 x 40 mesh granules. Alternately, the water may be mixed with an activated carbon-water slurry (about 1 lb. per 1000 gallons) and filtered. Optionally, this carbon-water slurry may be supplied from the carbon-recovery process to be described subsequently. In the case of the granular regenerable activated carbons, the adsorptive capacity of the exhausted carbon can be restored by thermal treatment in a furnace at a temperature of about 1500 to 1700° F. Steam and a small amount of air are passed through the furnace. For example the BOD of waste water passed through a total bed depth of about 20 to 36 feet of activated carbon at a flow rate of about 4 to 10 gallons per minute per square feet may be reduced to about ¼ of the influent BOD or to about 12 p.p.m. or less e.g. 3 to 9 p.p.m. Effluents containing less than 1 to 4 parts per million organics, as measured by the total organic carbon test (TOC) may be also obtained. Clear, colorless, nonfoaming effluents can be obtained by the aforesaid process with substantially no odor. This water is quite satisfactory for cooling water or process water in a number of industrial applications.

Optionally, disinfection may be resorted to if needed to control bacteria. In such case chlorine, including hypochlorites, may be added at dosages of 1 to 25 p.p.m. and usually 1 to 5 p.p.m. A residual chlorine (excess remaining after 15 to 20 minutes) of 0.5 p.p.m. is generally required where disinfection is necessary. In addition to being a bacteriostat and bactericide, chlorine may be used to control odors, remove ammonia, and as coagulant. Optionally, the water may be filtered after chlorination.

To purify the water still further the water may be treated to remove dissolved and suspended solids by standard ion-exchange processes as described in Perry's Chemical Engineers' Handbook, fourth edition, 1963, pages 19–26. This may include the familiar zeolite or base-exchange softener process for removing calcium and magnesium and a mixed bed of hydrogen-cycle cation-exchange resin and strong-base anion-exchange resin for removing other undesirable anions and cations. Typical ion-exchange materials are listed in Table 16–3, pages 16–6 to 8 of the above mentioned reference. For example such mixed bed demineralizers operating at 50 to 75 gallons per minute per square foot may produce water having the following specification in parts per billion: total dissolved solids 25–500, silica 10–20, iron 10, copper 2–10, suspended solids 40, and specific conductance 0.1 micromhos.

Optionally, the pure water used in tubular heat exchangers and in waste heat boilers for the generation of steam is deaerated to remove any dissolved gases. This may be accomplished for example by heating the water to a boiling point by direct contact with steam produced subsequently in the process and allowing the heated water to cascade over trays. When necessary, conventional boiler feed water defoaming compounds such as alkyl amines and poly amides may be employed.

The stream of thickened sewage sludge from the sludge concentrator is introduced into a suitable mixing tank where it is mixed with a fluid selected from the group consisting of $H_2O$, liquid hydrocarbon fuel, particulate carbon-liquid hydrocarbon fuel slurry or particulate carbon-water slurry produced subsequently in the process, and mixtures thereof so as to produce a feed mixture stream having a combustible solids content in the range of about 25 to 60 weight percent and preferably in the range of about 30 to 50 weight percent. The aforesaid fluid may be in the liquid or vapor state, or both.

Mixing may be done in the line by means of a suitable mixer such as an in-line venturi mixer and conventional mixing equipment as described in the aforementioned Perry's Chemical Engineers' Handbook, pages 19–3 to 19–16. Mixing tanks of sufficient hold-up capacity to smooth out any discontinuity in the composition of the feedstock are suggested. The term "liquid hydrocarbon fuel" as used herein encompasses almost any liquid hydrocarbon fuel suitable for charging a synthesis gas generator including: butane, pentane, hexane, benzol, toluol, natural gasoline, gasoline, naphtha, gas oil, residual fuel, reduced crude, fuel oil, whole crude, coal tar oil, shale oil, tars and oil and mixtures thereof. Preferably, the liquid hydrocarbon fuel has a gravity in the range of about 5 to 50° API and a gross heating value in the range of about 17,000 to 18,500 b.t.u. per pound. Heat may be required to make some fluids pumpable. The liquid hydrocarbon fuel from an outside source may be added directly to the feedstream at some suitable point before it is reacted; or, as in a preferred embodiment of the process, it may be a constituent of a liquid hydrocarbon fuel particulate carbon slurry produced subsequently in the carbon-recovery zone.

$H_2O$ may be used alone or in combination with other fluidizing mediums and may be supplied to the mixing facility either in the liquid or gaseous phase. When steam is used, its sensible heat facilitates the mixing step. Optionally, the feed may be admixed with steam prior to, during, or after the thickened sewage sludge is mixed with the liquid hydrocarbon fuel. When $H_2O$ is used in combination with a liquid hydrocarbon fuel the preferred weight ratio of $H_2O$ to liquid hydrocarbon fuel is in the range of about 0.2 to 0.5 part by weight of $H_2O$ for each part of liquid hydrocarbon fuel. In one embodiment of the invention, the $H_2O$ is a constituent in a particulate carbon-water slurry produced subsequently in the carbon-recovery zone.

The aforesaid feed mixture stream may be moved by means of a suitable conveying system e.g. slurry pump or screw conveyor. Although the feed mixture stream may be introduced at ambient temperature directly into a synthesis gas generator, it is preferably heated to a temperature in the range of about 212° F. to 600° F. by means of a suitable heater or heat exchanger to produce a feed dispersion stream or suspension comprising particles of sewage, particulate carbon, liquid and vaporized hydrocarbon fuel, and steam. Preferably, a tubular feed heater may be used having tubes of relatively greater length in comparison with cross sectional area (for example about 1" to 8" inside diameter and larger and about 500–4000 ft. long). Further, by controlling the volume and the velocity of the feed mixture stream to ensure highly turbulent flow conditions within the tubular feed heater, the entrained bits of sewage and solid waste matter in the slurry mixture may be further disintegrated. It is preferable to maintain the velocity of the feed mixture stream at the inlet to the tubular feed heater in the range of about 10 to 30 feet per second. Advantageously, high pressure steam produced in a waste heat boiler by heat exchange with product gas to be described later may be used in the preparation of the feed slurry, and to provide heat for the aforesaid feed heater.

The feed dispersion stream leaving the feed heater is then introduced into a continuous flow type gasification reaction system. Preferably, the feed dispersion stream is introduced by way of a suitable burner into the top of a vertically aligned unpacked free-flow noncatalytic refractory-lined partial oxidation synthesis as generator of the type to be further described. Suitable synthesis gas generators are described in co-assigned U.S. Pat. 2,818,326, issued to Du Bois Eastman et al., which patent is incorporated herewith by reference.

Any suitable means may be used to introduce the feed mixture or dispersion stream and a stream of oxygen-rich gas into the synthesis gas generator. Optionally, supplemental hydrocarbon fuel and steam may be also introduced. Preferably, an annular type burner may be used, such as described in co-assigned U.S. Pat. No. 2,928,460, issued to Du Bois Eastman et al., which patent is incorporated herewith by reference. Such annulus type burners were previously employed only for heavy liquid hydrocarbon fuels. Alternately, the feed mixture of dispersion may be introduced into the upper end of an elongated cylindrical vertical reaction zone through a port. In such case, oxygen at high velocity is then introduced into the reaction zone through a separate port which discharges the oxygen stream directly into the feed mixture or dispersion stream. By this arrangement, the oxygen, steam, and suspended solids are intimately admixed within the reaction zone, and the stream of oxygen is prevented from directly impinging on the wall of the reactor.

As shown in the drawing for this specification, the discharge end of an annulus type burner assembly is inserted into the reaction zone of a compact unpacked free-flow noncatalytic refractory-lined synthesis gas generator of the type described in co-assigned U.S. Pat. No. 2,818,326, issued to Du Bois Eastman et al., which patent is incorporated herewith by reference. The discharge end of the annulus burner comprises an inner conduit through which the feed mixture or dispersion stream may be passed, surrounded by an annular passage through which a stream of gas rich in free oxygen may be passed. The oxygen-rich gas may be either air, oxygen enriched air (40 mole percent $O_2$ and more), preferably substantially pure oxygen (95 mole percent $O_2$ and more), or mixtures of steam and one of said oxygen-rich gases. Near the tip of the burner the annular passage converges inwardly in the shape of a hollow right cone. The oxygen-rich gas is thereby accelerated and discharged from the burner as a high velocity conical stream having an apex angle in the range of about 30° to 45° and an apex located from about 0–6 inches beyond the burner face. When the high velocity stream of oxidizing gas hits the relatively low velocity stream of the feed dispersion the particles of solid waste matter impinge against one another and are fragmented still further. The temperature of the oxygen-rich stream is in the range of about ambient to 1000° F. and perferably about 200 to 400° F. The discharge velocity of the feed mixture or dispersion stream from the burner is preferably in the range of 5 to 50 feet per second and the discharge velocity of the oxygen-rich gas stream is greater than 100 feet per second and preferably in the range of 200 feet per second to sonic velocity at the burner tip. Further, the feed to the burner may be reversed. In such instance, the feed mixture or dispersion stream is passed through the annular passage while the oxygen-rich gas stream is passed through the inner conduit.

When a liquid hydrocarbon fuel, such as 5° to 50° API fuel oil having a minimum gross heating value of about 17,000 B.t.u. per pound from an external source is burned along with the sewage sludge in the synthesis gas generator, the liquid hydrocarbon fuel may be admixed with the sewage at any convenient point in the process e.g. before or after the feed heater or separately introduced into the reaction zone by way of a double annulus burner. The relative proportions of sewage, noncombustible solids, liquid and vaporized hydrocarbon fuel, $H_2O$, particulate carbon and oxygen-rich gas fed to the reaction zone are regulated to ensure an autogenous temperature in the gas generation zone within the range of 1500–3000° F. and to produce about 0.1 to 10 wt. percent (weight percent) of particulate of particulate carboon (basis weight of carbon in the feed), and preferably about 0.5 to 4 wt. percent. The particulate carbon is entrained in the effluent stream of product gas leaving the reaction zone along with any noncombustible solids. The efficiency of the process may be increased by recovering said particulate carbon and recycling it to the reaction zone as a portion of the feed. The product gas comprises in mole percent dry basis: $H_2$, 25 to 55; CO, 20 to 40; $CO_2$, 5 to 35; $CH_4$, 0.06 to 8, and $COS+H_2S$, .1 to 2.0. Operating conditions in the gas generator are preferably: pressure in the range of about 1 to 250 atmosphere, atomic ratio of free oxygen to carbon in the feed in the range of about 0.8 to 1.4 atoms of $O_2$ for each atom of carbon, weight ratio of water to carbon in the feed in the range of about 0.2 to 3.0 parts of $H_2O$ to 1 part of carbon, and a time in the reaction zone of about 1 to 10 seconds.

The hot gaseous effluent stream from the reaction zone of the synthesis gas generator is passed through a gas-solids separating zone where substantially all of the noncombustible solids e.g., metal constituents, slag and ash are separated from the effluent gas stream. The noncombustible solids are accumulated in a slag chamber and are removed periodically from the system. The effluent gas stream is then passed through a gas cooler and is quickly cooled below the reaction temperature to a temperature in the range of about 300–700° F. Preferably, the effluent gas stream is cooled by indirect heat exchange with water in a waste heat boiler. The entrained particulate carbon may be then scrubbed from the effluent synthesis gas by contacting and further cooling the effluent stream of synthesis gas leaving the gas cooler with a suitable liquid e.g. liquid hydrocarbon fuel or water in a gas-liquid contact apparatus, for example, a spray tower, venturi or jet scrubber, bubble plate contactor, packed column, or in a combination of said equipment. For a detailed description of cooling synthesis gas by means of a waste heat boiler and a scrubbing tower, reference is made to U.S. Pat. 2,980,523, issued to R. M. Dille et al. Cooling water for indirect heat exchange with the hot effluent stream of synthesis gas in said waste heat boiler and for scrubbing entrained solids from the synthesis gas may be preferably obtained from the aforesaid water purification facility. High pressure stream is produced in said waste heat boiler at a pressure in the range of about 650 to 900 p.s.i.g. This steam may be used to preheat the feed mixture and dispersion or for other process and industrial applications, e.g. turbo compressor and turboelectric generators.

In an alternate embodiment of our invention, the hot gaseous effluent from the synthesis gas generator is cooled below the reaction temperature by direct quenching in water in a gas-liquid contacting or quenching zone. For example, the cooling water may be contained in a quench vessel or chamber located immediately down stream from the reaction zone of said gas generator. A large diameter dip leg starting at the bottom end of the reaction zone and discharging beneath the water level in the quench chamber serves as an interconnecting passage between the reaction zone and the quench zone through which the hot product gases may pass. This conduit also substantially equalizes the pressure in the two zones. A concentric draft tube open on both ends surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone. Recycle water from the carbon recovery zone to be further described is normally introduced through a quench ring at the top of the dip leg to cool the metal at that point. Large quantities of steam are generated in the quench vessel and the quench chamber may be likened to a high output, high pressure boiler. Make-up water for this gas quencking facility may be advantageously obtained from the aforesaid water purification system.

The turbulent condition in the quench chamber, caused by the large volumes of gases bubbling up through said annulus space, helps the water to scrub substantially all of the solids from the effluent gas, forming a dispersion of unconverted particulate carbon and quench water. Noncombustible solids including slag, silt, metal constituents, ash metal silicates and other solids which do not disperse in the quench water drop to the bottom of the quench vessel where they are periodically removed through a lock-hopper. This residue has some commercial value and may be used as a soil improver; or it may be sent to a metals reclaiming unit. Further, additional steam required for any subsequent process step may be picked up by the effluent synthesis gas during quenching. For a detailed description of a suitable quench chamber, reference is made to U.S. Pat. 2,896,927, issued to R. E. Nagle et al., which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, McGraw-Hill Co., New York, fourth edition, 1963, pages 18–55 to 56.

The synthesis gas leaving the cooling and scrubbing zone may be used as a source of feed gas for the synthesis of hydrocarbons, oxygen containing organic compounds or ammonia. The unwanted constituents are removed and safely disposed of by conventional methods.

The synthesis gas may be further processed by methods well known in the art to produce hydrogen for use in hydrogenation reactions. In such case, the cooled and scrubbed synthesis gas is reacted with steam at a temperature in the range of about 750° F. to 1012° F. over a conventional water-gas shift catalysts e.g. 85 wt. percent of $Fe_2O_3$ and 15 wt. percent of $Cr_2O_3$ to convert the CO into $H_2$ and $CO_2$. Following shift converison, carbon dioxide, hydrogen sulfide, and other acid gas constituents are removed by refrigeration or chemical absorption with hot potassium carbonate, alkanolamine solutions, or other absorption materials. Residual carbon monoxide may be removed by scrubbing the gas with an aqueous solution of cuprous ammonium chloride or by catalytic methanation. Further, pure liquid nitrogen may also be used to condense and separate argon, carbon monoxide and methane from the hydrogen stream.

It is desirable to maintain the concentration of particulate carbon in the gas cooling and scrubbing waters, below about 1 weight percent. In this manner the dispersion of carbon in water will be maintained sufficiently fluid for easy pumping through pipelines and for further procesing. Further, it is important with respect to the economics of the process that the particulate carbon be removed from the cooling and scrubbing water to permit the resulting clear water to be recycled and reused for cooling and scrubbing additional synthesis gas. This separation takes place in the carbon recovery facility.

In the carbon recovery facility any conventional method may be used for separating clear water from the particulate carbon-water slurry comprising about .5 to 2 weight percent of solids. For example naphtha may be used to displace the water from the carbon-water dispersion. Other methods include separation of clear water from the dispersion by gravity settling, centrifuge, and filtration. In another embodiment of the process, the particulate carbon-water dispersion is mixed with a light hydrocarbon liquid fuel such as naphtha forming a light hydrocarbon liquid fuel-particulate carbon slurry and a clarified water phase. The clarified water phase is then separated from the light hydrocarbon liquid fuel-particulate-carbon slurry in a decanter and recycled for use in quench cooling and scrubbing more effluent synthesis gas from the gas generator. Low cost fuel oil is then mixed with the light hydrocarbon liquid fuel-particulate carbon slurry and the mixture is introduced into a distillation column. In the distillation column, the light hydrocarbon liquid fuel is distilled off and reused to extract more carbon from the aforesaid particulate carbon-water disperison. Hot fuel oil particulate carbon slurry containing about 5 to 20 weight percent of carbon is removed from the bottom of the distillation column, optionally mixed with additional fuel oil, and mixed with the aforesaid thickened sewage sludge prior to being introduced into said fuel preheater for said synthesis gas generator.

Alternately, the particulate carbon-water dispersion may be introduced into a suitable standard gravity sedimentation unit, for example one described in Perry's Chemical Engineers Handbook fourt edition (1968), pages 19–42 to 19–54. Clear water is drawn off and recycled to the synthesis gas cooling and scrubbing zone, and thickened slurry of carbon water comprising about 1–3 weight percent solids is recycled and mixed with said thickened sewage sludge to constitute the fed to said synthesis gas generator. Optionally, in such case, a liquid hydrocarbon fuel may be added to the feed slurry prior to its introduction into the tubular heater.

In the second embodiment of the invention garbage is mixed with the thickened sewage sludge from the sludge concentrator to produce a feed mixture which is reacted by partial oxidation with an oxygen-rich gas and steam in the reaction zone of a free-flow noncatalytic synthesis gas generator. The operating conditions in the gas generator are substantially the same as given previously in connection with reacting thickened sewage sludge without the garbage. Optionally, a liquid hydrocarbon fuel such as fuel oil may be mixed with the feed mixture. Preheating the feed to a temperature in the range of about 212°–600° F. is optional, but preferred.

The term "beneficiated garbage" refers to municipal refuse including garbage and solid waste matter with substantially all of the non-combustibles removed e.g. metal, glass and ceramics. For example, cans, bottles etc. may be separated at the receiving plant or by the householder on a city-wide basis. Typical analyses of beneficiated garbage from two cities are shown in Table II.

TABLE II

| | Altoona, Pa. (weight percent) | | | Madison, Wis. (weight percent) | | |
|---|---|---|---|---|---|---|
| | As received | Dry | Dry and ash free | As received | Dry | Dry and ash free |
| Composition: | | | | | | |
| Carbon | 34.7 | 49.9 | 58.3 | 35.1 | 38.7 | 55.1 |
| Oxygen | 47.0 | 28.6 | 33.5 | 31.6 | 25.7 | 37.6 |
| Hydrogen | 7.4 | 5.8 | 6.8 | 5.7 | 5.1 | 7.3 |
| Nitrogen | 0.7 | 1.0 | 1.1 | 0.5 | 0.6 | 0.8 |
| Sulfur | 0.2 | 0.3 | 0.3 | 0.1 | 0.1 | 0.2 |
| Ash, other noncombustibles | 10.0 | 14.4 | | 27.0 | 29.8 | |
| Volatile matter | 50.2 | 72.3 | 84.5 | 51.8 | 57.2 | 81.4 |
| Moisture | 30.6 | | | 9.4 | | |
| Fixed carbon | 9.2 | 13.3 | 15.5 | 11.8 | 13.0 | 18.6 |
| B.t.u. per pound | 5,670 | 8,170 | 9,540 | 5,790 | 6,390 | 9,110 |

While beneficiated garbage is a preferred feedstock, the process is operable with a typical municipal refuse composition as shown in Table III, having a typical ultimate analysis as shown in Table IV.

TABLE III

| | Weight percent |
|---|---|
| Miscellaneous paper | 25 |
| Newspaper | 14 |
| Animal and vegetable refuse | 12 |
| Grass and dirt | 10 |
| Glass, ceramics, stones | 10 |
| Metallics | 8 |
| Cardboard | 7 |
| Wood | 7 |
| Textiles | 3 |
| Plastic film | 2 |
| Leather, molded plastics, rubber | 2 |
| Total | 100 |

TABLE IV

| | Weight percent |
|---|---|
| Moisture | 28.0 |
| Carbon | 25.0 |
| Oxygen | 21.1 |
| Glass, ceramics, etc. | 9.3 |
| Metals | 7.3 |
| Ash | 5.5 |
| Hydrogen | 3.3 |
| Nitrogen | 0.5 |
| Sulfur | 0.1 |
| Total | 100.0 |

Size reduction of garbage and other solid wastes may be effected by means of any suitable combination of conventional crushing, grinding, cutting, slitting, and pulping equipment. Suitable size reduction screening and separating equipment is described in Perry's Chemical Engineers' Handbook, McGraw Hill Co., fourth edition (1963), pages 8-2 to 59, 21-46 and 21-63 to 67. Specific equipment will depend upon the type of solid waste material that is being processed. For example, beneficiated garbage may be reduced to small bits by means of suitable grinding, cutting, and pulping equipment. Rotary cutters of the type shown in figure 8-61 of Perry's Chemical Engineers' Handbook are useful as are standard paper making equipment such as the Hydrapulper and Jordan refiner as shown in the Encyclopedia of Chemical Technology, Kirk-Othmer, Interscience (1967), volume 14, pages 497-500. When glass and metals such as bottles and light gauge tin cans and wire are reduced in size along with the rest of the garbage and solid waste matter, high power crushing and slitting equipment may be included in the size reduction step.

The garbage and solid waste matter are reduced to a particle size of about 1/16" or less. Particle size as well as the amount of metals and other noncombustible solids in the feedstream may be controlled by standard equipment for screening, gravity settling chambers, and by magnetic separators as previously described.

Bits of garbage from the size reduction facility are then mixed in the aforesaid mixing zone with thickened sewage sludge from the sludge concentrator and a sufficient amount of fluid selected from the group consisting of $H_2O$, liquid hydrocarbon fuel as previously described, particulate carbon-liquid hydrocarbon fuel slurry or particulate carbon-water slurry as produced subsequently in the process, and mixtures thereof so as to produce a pumpable feed slurry stream having a combustible solids content in the range of about 25 to 60 weight percent and preferably in the range of about 30 to 50 weight percent. When noncombustible solids are present in the feed, it is preferable that they not exceed about 30 weight percent. The aforesaid fluidizing medium may be in a liquid or vapor state. For example, a suitable feed slurry may contain in weight percent; thickened sewage sludge (25 to 60 wt. percent solids) 25 to 45; beneficiated garbage (1/16" diam.) 25 to 45, the remainder comprising a liquid hydrocarbon fuel having a gravity in the range of about 5 to 50° A.P.I. e.g. 15° A.P.I. fuel oil.

Then in the manner previously described in connection with the first embodiment in which sewage sludge was disposed of, the feed slurry stream is preferably introduced into an externally heated tubular feed heater at a velocity in the range of about 10 to 30 feet per second. The feed slurry stream is heated to a temperature in the range of about 212° F. to 600° F. to produce a feed dispersion stream comprising bits of sewage solids and garbage, particulate carbon, liquid and vaporized hydrocarbon fuel, and steam. The feed dispersion stream is introduced into said synthesis gas generator by way of a suitable burner and reacted by partial oxidation with a stream of oxygen-rich gas to produce synthesis gas. Operating conditions for the feed heater, burner and synthesis gas generator are substantially the same as those described previously in connection with the first embodiment in with sewage sludge was disposed of. Similarly, the analysis of the synthesis gas produced, the process for removing particulate carbon entrained therein, and the other steps for purifying the synthesis gas or converting it into hydrogen are substantially the same as described previously in connection with the first embodiment.

DESCRIPTION OF THE DRAWING AND EXAMPLES

A more complete understanding of the invention may be had by reference to the acompanying schematic drawing which shows the previously described process in detail. Although the drawing illustrates a preferred embodiment of the process of this invention, it is not intended to limit the continuous process illustrated to the particular apparatus or materials described. Quantities have been assigned to the various streams so that the description may also serve as an example.

Example I

With reference to the drawing, the raw material to be processed comprises about 15,000 tons per hour of sewage from the sanitary sewage lines of a municipality having a population of about 900,000 people. The sewage in line 1, comprising about 99.95 percent water and 0.05 percent total solids and having a BOD of about 200 p.p.m. (parts per million), is introduced into screening and separating facility 2. In screening facility 2 the raw sewage feed is screened through bar screens having a ¾" spacing and is then passed into a grit settling chamber not shown. The overflow from the grit settling chamber is passed through fine screens having ¼" openings. In this manner, a comparatively small amount of large sized objects such as sticks, vegetables, as well as any noncombustibles such as grit, sand and stones may be separated. Periodically the separated material is preferably removed by way of line 3 and hauled away for use as land fill. Optionally, the organic screenings may be ground and mixed with garbage as described in Example II.

The sewage in line 4 is introduced into a conventional primary sedimentation tank or clarifier 5 as previously described. About 750 tons per hour of sludge having the analysis shown in Table I are removed from primary sedimentation tank 5 by way of lines 6 and 7. This sludge stream is introduced into sludge concentrator 8 along with about 375 tons per hour of the sludge stream from line 9 produced subsequently in the process and having a total solids content of about 1 wt. percent (weight percent). The sludge in concentrator 8 is thickened to a total solids content of about 32 wt. percent. The ultimate chemical analysis on a dry basis and the gross heating value of the thickened sludge stream is shown in Table V.

TABLE V

| | Weight percent |
|---|---|
| Carbon | 50.2 |
| Hydrogen | 5.1 |
| Oxygen | 7.9 |
| Nitrogen | 2.5 |
| Ash | 34.3 |
| Gross heating value, B.t.u. per lb. | 8,000 |

About 14,250 tons per hour of liquid overflow stream containing about 50% of the solids entering with the feed through line 1 leave primary sedimentation tank 5 by way of line 10 and are mixed in line 11 with about 1,100 tons per hour of the liquid effluent stream leaving sludge concentrator 8 by way of line 12.

When necessary, the pH of the liquid in line 11 may be adjusted to about 6 or more and preferably in the range of about 6–9 by the addition of a suitable acid or alkali through line 3. The liquid in line 14 is then introduced into aerated biochemical facility 15 where biochemical decomposition of the organic matter in the influent takes place. For example by means of the well known activated sludge process in facility 15 the BOD may be reduced to less than 20 parts per million within about 2–4 hours.

The treated liquor stream leaving aerated biochemical facility 15 is introduced into sedimentation tank or clarifier 16 by way of line 17. Optionally, a small amount of coagulant e.g. alum may be added by way of line 18. Sludge is removed from clarifier 16 by way of line 9 and is introduced into sludge concentrator 8 as previously described. About 15,000 tons per hour of clear effluent from clarifier 16 is passed through line 19 into filtration unit 20 which includes multimedia filter beds where a relatively minor amount of solids may be removed by way of line 21. If necessary, the water may be again treated with alum and pressure filtered through a suitable filter media having a particle size of from about 0.15–1.0 mm. Optionally, coating the filter media with a suitable polyelectrolyte may increase the adsorptive capacity of their surface.

Optionally, any solid residue may be disposed of by adding to the material in mixing facility 22 to be more fully described.

The clear water from filtration unit 20 is passed through line 23 into acivated carbon adsorption facility 24 where residual taste, odor, gas, color and organics are removed by passing the water through beds of activated carbon granules 36 feet in depth at a flow rate of about 5 gallons per minute per square foot. Water leaves by way of line 25 and optionally may be disinfected for example with about 2 parts per million of chlorine from line 26 and filtered (not shown).

The water enters demineralization facility 27 by way of line 28 at a flow rate of about 50 gallons per minute per square foot. There by the familiar zeolite or base exchange softener process calcium and magnesium are removed and by a conventional mixed bed of hydrogen-cycle cation exchange resin and strong-base anion-exchange resin, undesirable anions and cations are removed, e.g. iron, copper, silica, manganese, sulfate, chloride, nitrate and phosphate. Pure water from line 29 may be produced thereby which is colorless and odorless and having the following specification in milligrams per liter: BOD 1 or less, COD 3–16, total organic carbon 1–6, suspended solids under 0.5, turbidity (units) under 0.5, phosphates 0.1–1.0, Coliform bacteria (M.P.N./100 ml.) 2.2–15, color colorless, odor odorless.

A portion of the pure water leaving demineralization facility 27 by way of line 29 may be passed through lines 30–31 and valve 32 into carbon recovery facility 33 for cooling and scrubbing hot product gas and recovering entrained particulate carbon therefrom. Another portion of the purified water may be introduced into gas cooler 34 by way of lines 29, 35–38 and valve 39 and is converted into high pressure steam. If necessary, the make-up water entering gas cooler 34 may be first deaerated by conventional means and a defoamer added. Excess pure water may be discharged from the system by way of lines 40–41, and valve 42. Although this water is potable, it is substantially used for other process requirements.

23.75 tons per hour of thickeneed sludge having a solids content of about 32 weight percent and containing about 68 weight percent of water are introduced into mixing facility 22 by way of line 43 and admixed with 1.3 tons per hour of a particulate carbon-fuel oil slurry stream produced subsequently in the process in carbon recovery facility 33 and comprising 7.7 wt. percent of particulate carbon in 15° API heavy fuel oil having a Gross Heating Value of 18,160 B.t.u. per lb. The particulate carbon-fuel oil slurry is pumped into mixing facility 22 by way of line 44, pump 45, lines 46–47, and valve 48. Optionally, supplemental fuel oil may be passed through lines 49–50 and valve 51 or steam through lines 52–53 and valve 54, or both and admixed with the thickened slurry in mixing facility 22 to produce said feed slurry stream.

From line 55, the feed slurry mixture of thickened sewage sludge, particulate carbon, and fuel oil is pumped at a pressure of about 800 p.s.i.g. by means of pump 56 through lines 57–59 and valve 60 and is introduced into heating coil 61 disposed in feed preheater 62. The feed slurry stream is heated by indirect heat exchange with high pressure steam which is produced in gas cooler 34. The steam leaves gas cooler 34, which may be a waste heat boiler, by way of line 63 and enters steam drum 64. The steam is then passed through lines 65–66 and valve 67 into feed preheater 62. Steam condensate from the bottom of feed preheater 62 is recycled by means of pump 68 through lines 69–70 and 38 into gas cooler 34 along with make-up water from line 37 as previously described. Alternately, feed preheater 62 may be by-passed by pumping the slurry feed stream through lines 71–72 and valve 73.

The volatile constituents in the feed slurry are preferably vaporized in heating coil 61, and at the same time the solid particles may be further disintegrated due to turbulent flow therein. A feed dispersion stream of solids, fuel oil, oil vapor and steam at a temperature of about 600° F. leaves feed preheater 62 through lines 74–75 and is passed through the inner passage or conduit 76 of a water cooled annulus burner 77 which is disposed in the upper end of unpacked noncatalytic free-flow synthesis gas generator 78, as previously described. The feed dispersion stream enters the reaction zone 79 axially at the upper end at a velocity of about 50 feet per second where it impinges and reacts with a stream of oxygen.

About 181,000 s.c.f.h. (standard cubic feet per hour) of substantially pure oxygen (99.5 mole percent) from line 80 are introduced into reaction zone 79 at a velocity of about 300 feet per second by way of annulus 81 of burner 77 at a temperature of 250° F.

Synthesis gas generator 78 as previously described, is free from packing and catalyst and preferably comprises a steel cylindrical pressure vessel 82 lined with refractory 83. Partial oxidation of the feed dispersion stream takes place in the reaction zone 79 at an autogenous temperature of about 1800° F. and at a pressure of about 600 p.s.i.g. About 1,200,000 s.c.f.h. of product gas containing 196 lbs. per hour of entrained particulate carbon and 5,130 lbs. per hour of solid residue comprising ash and other noncombustible solid particles are discharged axially from the lower end of reaction zone 79. The hot synthesis gas from reaction zone 79 is discharged through an outlet passageway 84 into connector 85 and transfer line 86 both of which are provided with a suitable refractory lining 87.

Any uncombustible solids, slag, or ash contained in the hydrocarbon oil, for example ash liberated in the conversion of a heavy residuum to synthesis gas, are discharged from the lower part of the reaction zone 79 as ash or slag. The solids are accumulated in slag chamber 88 which depends from connector 85. Any molten ash or slag discharged from outlet 84 of reaction chamber 79 drops directly into a pool of water 89 maintained in slag chamber 88 which effects quick cooling of the hot ash or slag from the generator and forms granular solid particles. Water is supplied to the slag accumulator 88 through line 90. It flows through a water jacket 91 in the upper part of slag chamber 88 and is discharged through a plurality of openings 92 into the interior of slag chamber 88. Water jacket 91 protects from overheating that portion of slag chamber 88 which is above the level of the pool of water 89 and below the level of refractory lining 87 of connector 85. About 5130 lbs. per hour of accumulations of solid material may be withdrawn as required from slag chamber 88 through lines 93–94 as controlled by valve 95. The water level in slage chamber 88 is suitably controlled by discharging water therefrom through lines 96–97 as controlled by valve 98 responsive to liquid level controller 99. The particles of noncombustible solid residue may contain metal silicates and other reaction products of any glass and metals in the feedstock, and ash from the reacted petroleum fuel oil which includes the oxides, sulfides, or salts of such heavy metals as vanadium, nickel, iron, chromium, and molybdenum. This residue is useful as a soil improver, or it may be sent to a metals reclaiming zone.

Hot effluent raw synthesis gas from gas generator 78 is passed through transfer line 86 to a gas cooler or waste heat boiler 34 wherein the gas stream is cooled by indirect heat exchange with water to a temperature above its dew point, e.g., to a temperature in the range of 400 to 600° F., generating high pressure steam which is delivered to steam drum 64 by way of line 63 and then to feed preheater 62 as previously described.

About 17,000 lbs. per hour of steam at a pressure of 900 p.s.i.g. may be discharged from steam drum 64 by way of lines 100–101 and valve 102. This steam may be used to power turboelectric generators, turbocompressors, or crushing, slitting and grinding equipment in size reduction facility 111 (Example II).

The cooled raw synthesis gas leaving gas cooler 34 and uontaining about 0.3 wt. percent of entrained particulate carbon is passed through line 103 into carbon recovery facility 33 which is described herewith but which is not shown in the drawing. As previously described, the entrained solid particles may be scrubbed from the stream of raw synthesis gas forming a particulate carbon-water slurry by means of a spray tower as described in U.S. Pat. 2,980,523 issued to R. M. Dille et al. Make-up water for scrubbing may be advantageously obtained from purified water as described previously entering through line 31. A suitable liquid hydrocarbon, e.g., naphtha, is mixed with the particulate carbon-water dispersion forming a naphtha-carbon slurry which is separated from the water in a decanter. About 2,350 lbs. per hour of the aforesaid 15° API heavy fuel oil having an ultimate analysis of 83.95% C, 10.56% H, 0.23% N, 5.24% S and 0.02% ash are added to the naphtha-carbon slurry by way of lines 104–105 and valve 106. By means of a fractional distillation column, naphtha is separated for reuse, and a preheated stream of particulate carbon-fuel oil slurry from the bottom of the fractionator is pumped into mixing facility 22 by way of line 44, pump 45, lines 46–47 and valve 48 as described previously.

A stream of about 600,000 s.c.f.h. of synthesis gas on a dry basis at a temperature of about 150° F. and a pressure of about 550 p.s.i.g. leave carbon recovery facility 33 by way of line 107 having the following composition.

|  | Mol percent |
| --- | --- |
| Carbon monoxide | 22.2 |
| Hydrogen | 4.74 |
| Carbon dioxide | 28.9 |
| Hydrogen sulfide | 0.27 |
| Carbonyl sulfide | 0.21 |
| Methane | 0.19 |
| Argon and rare gases | 0.06 |
| Nitrogen and trace components | 0.95 |

This gas may be used as fuel gas or in conventional catalytic process for the synthesis of organic chemicals. Or the synthesis gas may be further processed to produce hydrogen by the conventional water-gas shift reaction. $CO_2$, $H_2S$, A, COS and other impurities may be removed when necessary by conventional processes, as previously described.

Example II

The second embodiment of the invention pertains to a continuous process wherein a feed mixture stream comprising sewage sludge and bits of garbage is reacted by partial oxidation with free oxygen in a free-flow unpacked noncatalytic synthesis gas generator as previously described to produce synthesis gas, fuel gas or hydrogen.

Referring to the drawing, a stream of about 17.5 tons per hour of thickened sewage sludge having a solids content of 32 weight percent as produced in the manner as described previously in Example I and having the same analysis are mixed in mixing facility 22 with a stream of about 8 tons per hour of garbage from line 110, and a stream of about 8.5 tons per hour of carbon-water slurry comprising 1.0 weight percent carbon from line 47 and the carbon recovery facility 33. The stream of garbage from line 110 has an ultimate analysis as shown in Table II, column three, and is introduced into size reduction facility 111 by way of line 112. Optionally, screenings from line 3 in the sewage process stream (Example I) may be also ground and included in the feed. In size reduction facility 111 by means of any suitable combination of standard crushing, grinding, slitting, cutting, pulping, and screening equipment, as previously described, the garbage and solid waste material is reduced to bits having a maximum dimension of about $\frac{1}{16}$ inch. By screening and magnetic separation noncombustibles may be separated and sent to a reclaiming zone by way of line 113. The bits of garbage are then passed into mixing facility 22 as previously described by way of lines 114, 110 and valve 115 where a pumpable feed slurry is produced.

The feed slurry stream is passed through feed preheater 62 where it is converted into a feed dispersion of bits of solids in steam. About 33.2 tons per hour of the feed dispersion stream are reacted by partial oxidation at an autogenous temperature of 1,800° F. in a free-flow noncatalytic synthesis gas generator 78 with a stream of about 206,000 s.c.f.h. of 99.5 mole percent oxygen.

The stream of effluent synthesis gas leaving the gas generator is cooled in gas cooler 34 and is introduced into carbon recovery facility 33 where particulate carbon is separated by conventional methods such as described in U.S. Pat. 3,016,986 issued to R. M. Dille et al. A carbon-water slurry stream is produced in carbon recovery facility 33 and is recycled to mixing facility 22 as previously described by way of lines 44, pump 45, lines 46–47, and valve 48.

All other details of Example II, including the steps for obtaining purified water and thickened sludge from the sewage, are substantially the same as described previously in Example I. 650,000 s.c.f.h. of synthesis gas on a dry basis are produced having the following composition.

|  | Mole percent |
|---|---|
| Carbon monoxide | 18.8 |
| Hydrogen | 45.2 |
| Carbon dioxide | 34.9 |
| Nitrogen | 0.9 |
| Methane | 0.07 |
| Argon and rare gases | 0.06 |
| Hydrogen sulfide | 0.06 |

The aforesaid product gas may be processed further to produce hydrogen by the well known water gas shift reaction using iron-chromium oxide or other shift catalyst. $CO_2$, $H_2S$, COS, A, and $CH_4$ may be removed by well known techniques, e.g. cryogenic separation or chemical absorption.

Obviously many modifications and variations of the invention as hereinbefore set forth may be made without departing from the spirit and scope thereof, and only such limitations should be imposed as are indicated in the appended claims.

We claim:

1. A process for disposing of sewage and solid waste matter comprising
   (1) dewatering said sewage and solid waste matter in a dewatering zone to produce a thickened sludge and liquid overflow;
   (2) mixing the thickened sludge from (1) in a mixing zone with a fluid selected from the group consisting of $H_2O$, liquid hydrocarbon fuel, liquid hydrocarbon fuel-particulate carbon slurry, particulate carbon-water slurry, and mixtures thereof to produce a feed mixture;
   (3) introducing said feed mixture from (2) into the reaction zone of a free-flow unpacked noncatalytic synthesis gas generator; and
   (4) reacting said feed mixture by partial oxidation with an oxygen-rich gas and steam at an autogenous temperature in the range of about 1500 to 3000° F. and at a pressure in the range of about 1 to 250 atmospheres to produce a hot gaseous effluent stream comprising hydrogen, carbon monoxide, carbon dioxide, water, and particulate carbon.

2. The process of claim 1 wherein the reaction zone of step (3) the atomic ratio of free-oxygen to carbon is in the range of about 0.8 to 1.4 and the weight ratio of $H_2O$ to carbon is in the range of about 0.2 to 3.0.

3. The process of claim 1 with the additional step of heating the feed mixture from step (2) in a heating zone to produce a feed dispersion comprising particles of sewage and solid waste matter, liquid and vaporized hydrocarbon fuel, and steam, and introducing said feed dispersion into said reaction zone in step (3) as said feed mixture.

4. The process of claim 1 with the additional steps of cooling and scrubbing said hot gaseous effluent steam from the reaction zone in step (4) with water in a gas cooling and scrubbing zone, separating said entrained particulate carbon from said gaseous effluent stream by forming a particulate carbon-water dispersion, separating clear water from said particulate carbon-water dispersion in a carbon-recovery zone while producing a liquid hydrocarbon fuel-particulate carbon slurry, and recycling said liquid hydrocarbon fuel-particulate carbon slurry to said mixing zone to provide at least a portion of said fluid in step (2).

5. The process of claim 1 with the additional steps of cooling and scrubbing said hot gaseous effluent stream from the reaction zone with water in a gas cooling and scrubbing zone, separating said entrained particulate carbon from said gaseous effluent stream by forming a particulate carbon-water dispersion, separating clear water from said particulate carbon-water dispersion in a carbon-recovery zone while producing a particulate carbon-water slurry, and recycling said particulate carbon-water slurry to said mixing zone as at least a portion of said fluid in step (2).

6. The process of claim 1 with the additional step of introducing the feed mixture of step (2) into the reaction zone of said synthesis gas generator by way of the inner conduit of an annulus-type burner at a velocity in the range of about 5 to 50 feed per second, and contacting said feed mixture in said reaction zone with a stream of oxygen-rich gas which is introduced into said reaction zone by way of the annulus of said burner at a velocity in the range of about 100 feet per second to sonic velocity.

7. The process of claim 1 with the additional steps of processing the liquid overflow from step (1) in a water purification zone to produce pure water and sludge; introducing said sludge into the mixing zone of step (2) and introducing at least a portion of said pure water into a waste heat boiler in indirect heat exchange with the hot gaseous effluent stream from step (4) thereby cooling said effluent gas stream and producing steam.

8. The process of claim 1 wherein bits of garbage are mixed with the feed mixture in step (2).

9. The process of claim 7 with the added steps of recovering particulate carbon from the effluent gas stream leaving the reaction zone and introducing same into said water purification zone to help purify said water.

10. A process for the production of synthesis gas or fuel gas comprising dewatering sewage in a dewatering zone to produce a thickened sludge and liquid overflow; mixing said thickened sludge in a mixing zone with a fluidizing medium comprising a liquid hydrocarbon fuel-particulate carbon slurry produced subsequently in the process to produce a pumpable feed slurry stream; heating said feed slurry stream to a temperature in the range of about 212 to 600 F. to produce a feed dispersion stream comprising particles of sewage sludge, particulate carbon, liquid and vaporized hydrocarbon fuel, and steam; introducing said feed dispersion stream into the reaction zone of a free-flow unpacked noncatalytic synthesis gas generator; reacting said feed dispersion stream in said reaction zone by partial oxidation with an oxygen-rich gas and steam at an autogenous temperature in the range of about 1500 to 3000° F., a pressure in the range of about 1 to 250 atmospheres, an atomic ratio of free oxygen to carbon in the feed in the range of about 0.8 to 1.4, a weight ratio of water to carbon in the feed in the range of about 0.2 to 3.0, and a time in the reaction zone in the range of about 1 to 10 seconds to produce a hot gaseous effluent stream comprising CO, $H_2$, $CO_2$, $H_2O$ and minor amounts of $N_2$, A, $CH_4$, particulate carbon, and noncombustible solid particles; introducing said hot gaseous effluent stream from the reaction zone into a gas-solids separating zone and separating therefrom said noncombustible solid particles; cooling the effluent gas stream in a cooling zone; introducing the cooled effluent gas stream into a carbon recovery zone and separating therefrom said particulate carbon as a liquid hydrocarbon fuel-particulate carbon slurry; and introducing said liquid hydrocarbon fuel-particulate carbon slurry into said mixing zone as said fluidizing medium.

11. The process of claim 10 with the additional steps of processing the liquid operflow from said dewatering zone in a water purification zone to produce pure water and sewage sludge, introducing said sewage sludge into the said mixing zone, and introducing at least a portion of said pure water into a waste heat boiler in indirect heat exchange with said hot gaseous effluent stream to provide said cooling for said effluent gas stream and to produce steam.

12. The process of claim 10 wherein bits of garbage are admixed with said thickened sludge in said mixing zone.

References Cited

UNITED STATES PATENTS

| | | | |
|---|---|---|---|
| 1,777,449 | 10/1930 | Rath | 48—209 UX |
| 2,126,150 | 8/1938 | Stryker | 48—209 UX |
| 3,362,887 | 1/1968 | Rodgers | 48—209 X |
| 3,471,275 | 10/1969 | Borggreen | 48—209 |

FOREIGN PATENTS

| | | | |
|---|---|---|---|
| 301,427 | 11/1928 | Great Britain | 201—25 |

MORRIS O. WOLK, Primary Examiner

R. E. SERWIN, Assistant Examiner

U.S. Cl. X.R.

48—197 R, 215; 110—8 R, C; 252—373

PO-1050
(5/69)

UNITED STATES PATENT OFFICE
CERTIFICATE OF CORRECTION

Patent No. 3,687,646          Dated August 29, 1972

Inventor(s) ALBERT BRENT and CHARLES F. TEICHMANN

It is certified that error appears in the above-identified patent and that said Letters Patent are hereby corrected as shown below:

| | |
|---|---|
| Col. 1, Line 12 | Change "suseful" to --useful-- |
| Col. 1, Line 18 | Change "is" to --as-- |
| Col. 5, Line 20 | Change "18-81" to --19-81-- |
| Col. 5, line 25 | Change "slurge" to --sludge-- |
| Col. 7, Line 27 | Change "as" to --gas-- |
| Col. 8, line 28 | After "percent)" delete --of particulate)-- |
| Col. 9, line 32 | Change "quencking" to --quenching-- |
| Col. 10, line 46 | Change "fourt" to --fourth-- |
| Col. 10, line 51 | Change "fed" to --feed-- |
| Col. 13, line 44 | Change "3" to --13-- |
| Col. 15, line 68 | Change "uontaining" to --containing-- |
| Col. 16, line 23 | Change "4.74" to --47.4-- |
| Col. 18, line 21 | Change "mixtuse" to --mixture-- |
| Col. 19, line 6 | Change "operflow" to --overflow-- |

Signed and sealed this 30th day of January 1973.

(SEAL)
Attest:

EDWARD M. FLETCHER, JR.
Attesting Officer

ROBERT GOTTSCHALK
Commissioner of Patents